United States Patent [19]

Adamson

[11] 4,251,987
[45] Feb. 24, 1981

[54] DIFFERENTIAL GEARED ENGINE

[75] Inventor: Arthur P. Adamson, Cincinnati, Ohio

[73] Assignee: General Electric Company, Cincinnati, Ohio

[21] Appl. No.: 68,813

[22] Filed: Aug. 22, 1979

Related U.S. Application Data

[62] Division of Ser. No. 710,423, Aug. 2, 1976, abandoned.

[51] Int. Cl.³ .............................................. F02C 3/06
[52] U.S. Cl. .................. 60/39.75; 60/226 R; 74/665 S; 417/405
[58] Field of Search .................. 60/226 R, 262, 39.75, 60/39.16 R, 39.16 S; 415/122 A, 122 R; 74/665 K, 665 S, 714; 417/405

[56] References Cited

U.S. PATENT DOCUMENTS

| | | | |
|---|---|---|---|
| 2,496,857 | 2/1950 | Cronstedt et al. | 74/665 K |
| 2,693,080 | 11/1954 | Hutchinson | 60/39.16 R |
| 2,804,748 | 9/1957 | Hutchinson | 60/39.75 |
| 3,449,914 | 7/1969 | Brown | 60/39.16 R |
| 3,632,222 | 1/1972 | Cronstedt | 60/39.75 |
| 3,673,802 | 7/1972 | Krebs et al. | 60/226 R |
| 3,688,505 | 9/1972 | Dison | 60/226 R |
| 3,823,553 | 7/1974 | Smith | 60/39.16 R |
| 3,853,432 | 12/1974 | Cronstedt | 415/122 R |
| 3,971,208 | 7/1976 | Schwent | 60/262 |
| 4,005,575 | 2/1977 | Scott et al. | 60/226 R |

OTHER PUBLICATIONS

Doyle et al., "Split Compressor Differential Gas Turbine...," Journal of Eng. For Power, 1966, pp. 1-11.
Bowden et al., "Some Thoughts About... Gas Turbine Units," Journal of Eng. For Power, 1959, pp. 73-96.

*Primary Examiner*—Robert E. Garrett
*Attorney, Agent, or Firm*—Robert C. Lampe, Jr.; Donald W. Walk; Derek P. Lawrence

[57] ABSTRACT

A gas turbine engine comprising a fan, a compressor and a turbine, wherein the torque requirements of the fan or compressor can be modulated, is provided with differential gearing to transmit all of the fan and compressor power requirements from the turbine. The differential gearing maintains an adjustable speed relationship between the fan and compressor with respect to the turbine depending upon the torque requirements thereof and the gear ratios within the differential gearing.

6 Claims, 5 Drawing Figures

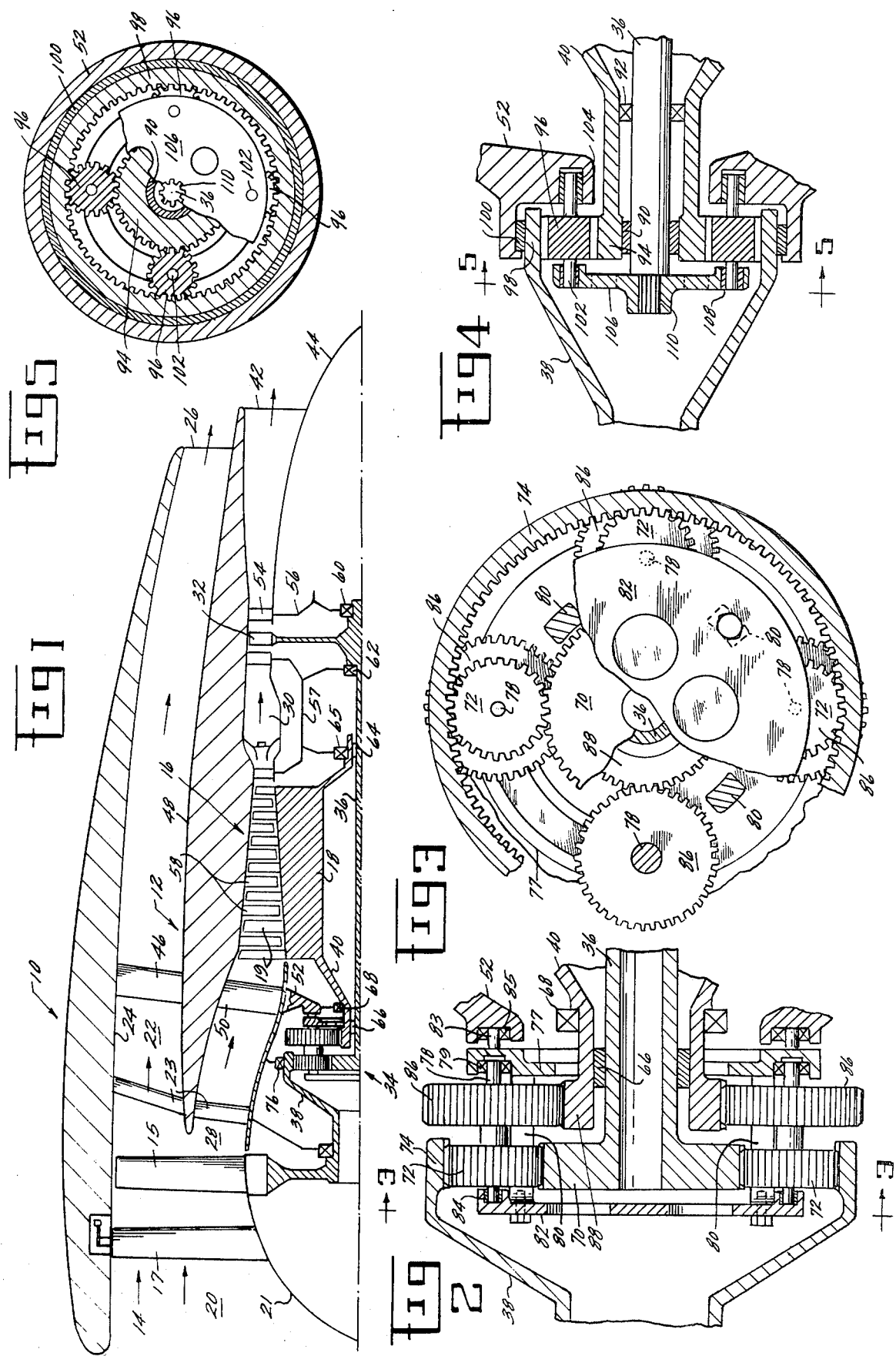

DIFFERENTIAL GEARED ENGINE

This is a division of application Ser. No. 710,423, filed Aug. 2, 1976, now abandoned.

BACKGROUND OF THE INVENTION

The present invention relates to gas turbine aircraft engines and, more particularly, to gas turbofan engines in which the power extraction of the compressor and fan portions can be modulated.

It is well understood that gas turbine aircraft engines are designed to operate most efficiently at one particular condition at which the individual components are optimized and matched. Any off-design operation suffers an efficiency penalty. With the trend toward multimission aircraft with a variety of operating cycles it becomes desirable both economically and from a performance standpoint to tailor the engine operating characteristics accordingly. Current gas turbine aircraft engines tend to be somewhat inflexible in their ability to match component characteristics for varying operating modes, though some notable advances have been developed toward that end. These include the incorporation of variable compressor and fan stators, variable inlet guide vanes, bleed valves, variable area turbine and exhaust nozzles and variable pitch fan blades.

In a high bypass turbofan engine having a large fan diameter, the fan moves many times the amount of air received by the core engine. It is appreciated that during flight conditions the most efficient practical propulsive system is one in which the exhaust velocity is approximately twice that of the vehicle being propelled. Thus, during low speed subsonic flight, it is desirable to move large quantities of air at relatively low velocities, and the turbofan is well adapted for this purpose. As speed increases, the optimum engine cycle approaches that of a turbojet which moves a relatively smaller amount of air, but at a much higher velocity. What is needed is a single engine which can be modulated to perform efficiently throughout these varying flight conditions by properly matching and modulating component characteristics. Modulating the rotational speed relationship between components is an effective way of accomplishing this objective.

Furthermore, the fan rotational speed is limited to a degree by the tip velocity and, since the diameter is very large, rotational speed must be very low. The core compressor, on the other hand, because of its much smaller tip diameter, can be driven at a higher rotational speed. Thus, the necessity for separate turbines for the fan and core compressor on existing gas turbofan engines. Since the turbine is most efficient at high rotational speeds, the lower speed turbine driving the fan requires additional stages to extract the work necessary to drive the fan. These additional stages result in weight penalties which are undesirable in aircraft applications. It is desirable, therefore, to provide an engine configuration in which the turbine weight is minimized.

SUMMARY OF THE INVENTION

Accordingly, it is the primary object of the present invention to provide a gas turbine aircraft engine in which the power extraction of the compressor and fan portions can be modulated.

It is another object of the present invention to provide a gas turbine aircraft engine having a compressor and a fan driven at differentially variable speeds by a common turbine.

It is yet another object of the present invention to provide a gas turbofan engine configuration in which the component characteristics may be made to vary in a compatible manner throughout a wide range of engine operation.

These and other objects and advantages will be more clearly understood from the following detailed description, drawings and specific examples, all of which are intended to be typical of rather than in any way limiting on the scope of the present invention.

Briefly stated, the above objectives are accomplished in an engine wherein the fan and core compressors are driven through a system of differential gearing which accepts power from a common turbine and transmits the power to the compressor and fan. However, the rotational speeds of the fan and compressor are not necessarily equal and the rotational speed of neither is necessarily equal to that of the turbine. Through the use of known torque and flow varying techniques, such as variable pitch fans or variable core compressor stators, the power extraction and rotational speed relationships may be modulated.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a partial cross-sectional view of a gas turbine engine incorporating the subject invention;

FIG. 2 is an enlarged schematic cross-sectional view of the differential gearing of the engine of FIG. 1;

FIG. 3 is a fragmented view taken along line 3—3 of FIG. 2 which depicts the subject invention in greater detail;

FIG. 4 is an enlarged cross-sectional view of an alternative embodiment of the differential gearing of the engine of FIG. 1; and FIG. 5 is a fragmented view taken along line 5—5 of FIG. 4.

DESCRIPTION OF THE PREFERRED EMBODIMENT

Referring to the drawings wherein like numerals correspond to like elements throughout, attention is first directed to FIG. 1 wherein a gas turbine engine depicted generally at 10 is diagrammatically shown. This engine may be considered as comprising generally a core engine 12 and a rotatable low pressure compressor, here a fan assembly 14 having a stage of rotatable blades 15 and a stage of variable pitch inlet guide vanes 17. The core engine 12 includes an axial flow high pressure compressor 16 having a rotor 18 carrying bladed elements 19 adapted to rotate in unison. Air enters inlet 20 defined by faired spinner 21 carried by fan assembly 14 and is initially compressed by the fan assembly. A first portion of this compressed air enters the fan bypass duct 22 defined, in part, by core engine 12 and a circumscribing fan duct wall 24 and discharges through a fan nozzle 26. A second portion of this compressed air enters core engine inlet 28, is further compressed by the axial flow compressor 16 and is then discharged through a combustor 30 where fuel is mixed with the compressed air and burned to provide high energy combustion gases which drive a rotatable turbine 32. The turbine, in turn, provides power to a system of differential gears 34 through shaft 36. The differential gearing transmits the power to rotate fan assembly 14 through shaft 38, and the power to rotate compressor rotor 18 through shaft 40. A propulsive force is thus obtained by the action of the fan assembly pressurizing air which discharges from the fan bypass duct 22 through the fan nozzle 26 and by the discharge of combustion gases from a core engine nozzle 42 defined, in part, by plug 44.

The engine static support structure comprises a plurality of generally radially extending struts 46 circumferentially spaced around the engine and connecting the fan duct wall 24 to the casing 48 of the core engine 12, a plurality of struts 50 spanning core engine inlet 28 and connecting core engine casing 48 to forward internal static structure 52 which is adapted to support the various rotating parts, including differential gearing 34, at the front of the engine, and a plurality of circumferentially spaced struts 54 at the rear of the engine which connects the core engine casing 48 to rear static structure 56. Rear static structure 56 is adapted to support plug 44 and the rotating parts at the rear of the engine. Other static structure is, of course, provided as at 57 to support the combustor 30, stages of variable pitch, nonrotating airfoils (stators) 58 interposed between rotatable airfoil stages 19, and bypass duct defining walls 24 as required, the specific design of such structure being well within the capabilities of a person skilled in the gas turbine aircraft engine design arts. Shaft 36 is journaled for rotation within rear static structure 56 and static structure 57 at bearings 60 and 62, respectively. Typically, only one of these bearings would be necessary, the other being optional. Core compressor rotor 18 is journaled for relative rotation between rotatable shaft 36 and static structure 57 by bearings 64 and 65, respectively. Again, only one of these bearings would be required, the other being optional. Struts 23 (optional) straighten the fan exhaust flow.

The differential gearing 34 will now be described with more particularity with reference to FIGS. 1–3. As is most clearly shown in FIGS. 2 and 3, compressor shaft 40 is further journaled for rotation about turbine shaft 36 by means of optional bearings 66, and journaled for rotation within static structure 52 by means of bearing 68 (FIG. 1). The differential gearing comprises a sun gear 70 formed on the forward end of turbine shaft 36 and which, therefore, rotates at turbine speed. A plurality of first planet gears 72 (here four in number for sake of illustration) are disposed about and engage the sun gear. A surrounding ring gear 74 associated with shaft 38 meshes with each of said first planet gears 72, the ring gear being journaled for rotation within the engine static structure by means of bearing 76. The first planet gears are each rotatable about an associated shaft 78 journaled at one end within aft spider 77 by bearings 79. The opposite end of each shaft is journaled within a forward spider 82 by bearings 84, the forward and aft spiders connected through lugs 80 and serving to carry the four first planet gears 72 in unison as they rotate about shaft 36 in a manner soon to be described. The aft spider 77, in turn, is journaled for rotation within static structure 52 by a pair of bearings 83, 85. Each shaft 78 also carries therewith a second planet gear 86 rigidly affixed thereto which rotates with, and is driven by, its associated first planet gear 72. Gear 86, in turn, drives compressor rotor 18 through gear 88 affixed to the forward end of compressor shaft 40. Note that the diameters of planet gears 72 and 86 are different, the relative sizes being a function of the desired gear ratio, and therefore the desired speed and torque relationship, between the core compressor rotor and fan assembly 14.

Thus, in operation, turbine power is transferred through shaft 36 to rotate sun gear 70 which, in turn, drives first planet gears 72. Through the geared engagement of the planet gears with the circumscribing ring gear 74, and the engagement of gears 86 and 88, power is transmitted to the fan assembly and core compressor which are driven rotationally, but not necessarily at the same speed, about turbine shaft 36.

The differential gear system will accept power from the turbine 32 and transmit the power to the compressor and fan in accordance with the well-known differential gear characteristics, i.e., $$N_T = k_1 N_F + k_2 N_C$$

where $N_T$ = speed of turbine (rpm)
$N_F$ = speed of fan (rpm)
$N_C$ = speed of compressor (rpm)
$k_1$, $k_2$ = constants dependent upon the associated gear ratios.

Notice, therefore, that fan speed can increase at the expense of core compressor speed, and vice versa. Furthermore, through equilibrium of the gear elements, the constants $k_1$ and $k_2$ set the torque relationship between the fan and compressor. Since power is merely the product of torque and speed, then for any particular operating condition where the total turbine power is known, the power ratio between the fan and compressor can be varied depending upon the setting of variable compressor stators, for example. Therefore, in operating the engine of FIG. 1 at any particular turbine overall power setting, the speed relationship between the fan, compressor and turbine can be adjusted by modulating the torque versus speed characteristic of either the fan or compressor. In essence, the speed versus speed relationship will settle out naturally at values determined by the torque characteristics of the fan and compressor, and the changes in speed will vary the aerodynamic characteristics of the components. For example, during periods of relatively low aircraft velocity the fan bypass flow rate may be increased at the expense of the core engine (i.e., increase bypass ratio) by adjusting the torque of the core compressor, thus increasing fan speed and decreasing core compressor speed. Conversely, during high speed operation, the torque of the fan may be modulated to decrease bypass ratio and fan speed, and increase the core compressor speed and core engine high velocity exhaust gas flow.

Various means are available within the existing technology for modulating the torque requirements of the various components. While not intended to be limiting, some of the means available include modulating the combustor fuel flow (which affects the back pressure on the compressor and hence its torque), variable pitch compressor stators, variable pitch turbine stators, bleed air extraction from the compressor, power extraction from the compressor or fan, variable pitch fan blades, variable inlet guide vanes for the fan or compressor, variable area exhaust nozzles and fan bleed air extraction. All of these or selected ones of them can be used to selectively match the compressor, fan and turbine speeds to optimum desired values depending on overall propulsion system objectives.

The gear ratios $k_1$ and $k_2$ are independent variables in the design of the engine and will be chosen by the designer after due consideration of the projected operating environment and the individual component aerodynamic characteristics. It should be noted, however, that in the present embodiment of FIG. 1, while no gear in the differential gearing 34 is restrained from rotation with respect to static support structure, there is mechanical linkage between the three major rotating components. Thus, since everything is mechanically linked there may be a tendency to drive the compressor or fan into stall unless the designer is careful to provide adequate stall margin or provides means for reducing back pressure on the components, such as by providing a secondary control mechanism to open variable area nozzles (not shown).

Note also that in the present invention a single turbine 32 has been provided and the need for separately rotatable fan turbines has been eliminated. While turbine 32 will most likely be of the multistage variety rather than of the single-stage variety as shown, a weight reduction will result nonetheless since the turbine may be run at an efficient, high speed condition while fan and compressor speeds are modulated. In the alternative embodiment of FIGS. 4 and 5, compressor shaft 40 is further jounaled for rotation about turbine shaft 36 by means of bearings 90 and 92. The differential gearing comprises a sun gear 94 formed on or splined to the forward end of compressor shaft 40, a plurality of planet gears 96 (again four in number) disposed about and engaging sun gear 94, and a surrounding ring gear 98 associated with shaft 38 having teeth meshing with planet gears 96, the ring gear journaled for rotation within static frame structure 52 by bearing 100. The planet gears 96 are each rotatable about an associated shaft 102 journaled at one end within static structure 52 by bearings 104. The opposite end of each shaft is journaled within a spider 106 by bearings 108, the spider, in turn, being splined to the forward end of turbine shaft 36 at 110 for rotation therewith. Thus, in operation, turbine power is transferred through shaft 36 to rotate spider 106 at turbine shaft rotational speed, carrying therewith planet gears 96. Through the geared engagement of the planet gears with interior sun gear 94 and external ring gear 98, power is transmitted to the core compressor and fan assembly which are driven rotationally, both in the same direction but not necessarily at the same speed, about turbine shaft 36. In fact, the rotation of the fan and compressor as imparted by the differential gearing will be in a direction opposite to that of the turbine in FIG. 1.

It will become obvious to one skilled in the art that certain changes and variations can be made to the above-described invention without departing from the broad inventive concepts thereof. For example, a variation of the engine of FIG. 1 could include a compressor split into two portions with a portion driven directly from the turbine and a portion from the differential gear. Additionally, the turbine could also be split into two sections with one section directly driving a compressor portion and another section providing power to the differential gear. Furthermore, alternate loads such as land-based power generators or ship or aircraft propellers could be substituted for the fan assembly of the engine of FIG. 1. Further uses will also be apparent to those skilled in the art where it is desirable to match the rotating speeds of two components in an optimum and variable way to permit both of them to operate efficiently at high and low speeds. It is intended that the appended claims cover these and all other variations in the present invention's broader inventive concepts.

Having thus described the present invention, what is claimed as novel and desired to be secured by Letters Patent of the United States is:

1. A gas turbine engine comprising: a compressor, a turbine and a nozzle, the geometry of which partially defines a flow passage through the engine; a rotatable load; differential gearing receiving power from said turbine and transmitting power to said compressor and load; and means for selectively varying the engine flow passage-defining geometry to modulate the torque versus speed characteristic of at least one of the pair comprising said load and said compressor and to selectively modulate the rotational speed relationship between the compressor, turbine and load, wherein said differential gear means comprises:
   a first sun gear driven by said turbine at turbine rotational speed;
   planet gearing engaging said first sun gear; and
   a ring gear driven by said planet gearing for driving said load in rotational motion with respect to said turbine; and wherein
   said planet gearing is operatively connected to said compressor for rotationally driving said compressor with respect to said turbine.

2. The engine as recited in claim 1 wherein said planet gearing includes a plurality of first planet gears engaged with, and radially between, said first sun gear and said ring gear.

3. The engine as recited in claim 2 wherein each of said first planet gears has associated therewith a shaft which rotates at first planet gear rotational speed, all of said first planet gears being carried by a spider for further rotation, in unison, with respect to said turbine.

4. The engine as recited in claim 3 wherein said planet gearing further includes a plurality of second planet gears, one of said second planet gears being connected to each shaft for rotation with an associated first planet gear, the diameter of said second planet gears being different than that of said first planet gears, and wherein said second planet gears drivingly rotate said compressor.

5. The engine as recited in claim 2 further comprising a second sun gear rotatably driven by said second planet gears, said second sun gear, in turn, driving said compressor.

6. The engine as recited in claim 4 further comprising a compressor shaft in gear driven engagement with said second planet gears and connected to said compressor.

* * * * *